Oct. 19, 1965 P. A. GILOVICH 3,213,460

RECORDER PEN MEANS

Filed July 29, 1963

3 Sheets-Sheet 1

INVENTOR.
PAUL A. GILOVICH
BY
Wm [signature]
ATTORNEY

INVENTOR.
PAUL A. GILOVICH
BY
[signature]
ATTORNEY

Oct. 19, 1965 P. A. GILOVICH 3,213,460

RECORDER PEN MEANS

Filed July 29, 1963 3 Sheets-Sheet 3

INVENTOR.

PAUL A. GILOVICH

BY Wm. L. Nolan

ATTORNEY

United States Patent Office 3,213,460
Patented Oct. 19, 1965

3,213,460
RECORDER PEN MEANS

Paul A. Gilovich, San Jose, Calif., assignor to Varian Associates, Palo Alto, Calif., a corporation of California Filed July 29, 1963, Ser. No. 298,051
17 Claims. (Cl. 346—29)

Figures 1, 2, 3, 4:
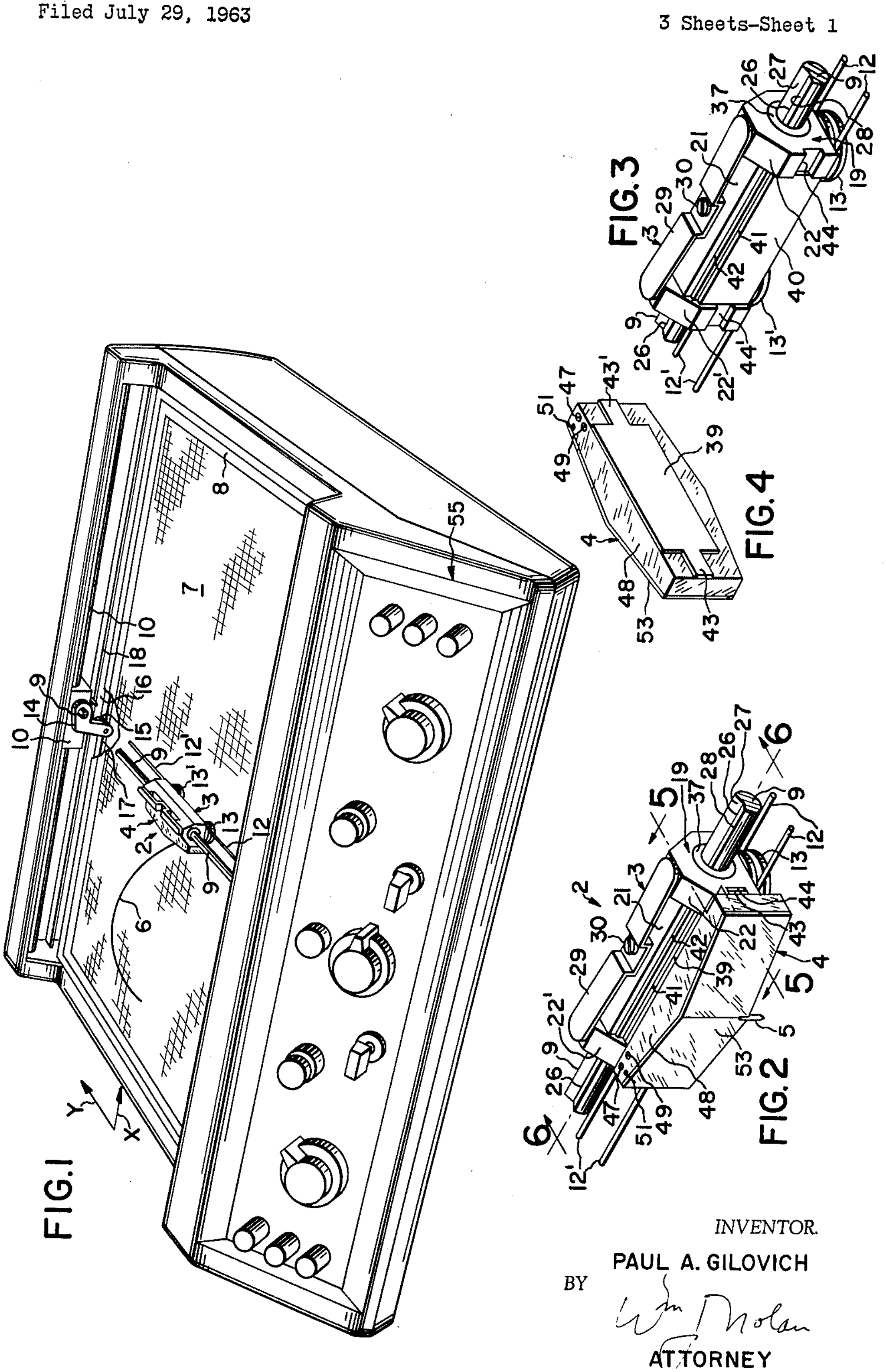

The present invention relates in general to recording devices and more particularly to a novel writing means for recording in response to electrical signals upon recording papers, graphs and the like.

One major difficulty encountered with prior art graphic recorders is that mechanical response lag in the writing assembly limits the mechanical writing accuracy of the recorder. If the pen mechanism or pen per se is not tightly secured to the pen holder, the pen holder generally moves with relation to the pen mechanism in response to a control signal before the pen holder and the pen mechanism move together. Although it is desirable, on the one hand, to have the pen mechanism fit tightly into the pen holder, it is often necessary, on the other hand, to remove the pen mechanism from the pen holder. The use of prior art means for tightly securing the pen mechanism to the pen holder such as set screws, for example, is disadvantageous because the pen mechanism may not be quickly and easily removed whenever adjustments must be made. Still another problem is that the recorder styli suitable for use in graphic and magnetic recording devices do not write regularly at high writing speeds owing to a tendency of the pen mechanisms to skip upon rapidly passing over surface irregularities. Still another difficulty with the pen mechanisms of prior art graphic recorders is that they are not suitable for use in positions in which the plane of the recorder's writing surface is vertically disposed unless capillary tubes are utilized to introduce ink into the pen mechanism. Although capillary tubes leading to a remote reservoir are utilized in prior art recorders, the use of such tubes impedes movement of the pen holder. Typically, the capillary tube is made of a metallic material which slides in contact with the pen holder producing frictional effects which decrease the mechanical response of the writing assembly. There is a need, moreover, for a pen holder which is adapted to hold more than one pen mechanism so that recording may be accomplished in various recording modes in a predetermined sequence.

The novel writing assembly of the present invention provides a solution to the above-noted problems by providing means for securing the recorder pen mechanism to the pen holder in a novel manner without the use of set screws or the like so that mechanical response lag in the writing assembly is substantially eliminated yet the pen mechanism is readily separable from the pen holder. A novel pen holder is also provided which produces uniform recording upon uneven recording surfaces without skipping of the recorder pen at high writing speeds owing to surface irregularities. This novel pen holder is adapted to hold two recorder pen structures, one of which may be a point plotter, for example. There is also provided a unitary recording means supplying a steady flow of ink to a recording pen for writing upon a recorder writing surface disposed in a horizontal position or in one or more vertical positions.

It is, therefore, an object of the present invention to provide a novel pen mechanism and pen holder for a recording apparatus.

One feature of the present invention is the provision in a recorder of a unitary pen carriage assembly including a pen mechanism and pen holder possessing a magnetic affinity and adapted to be attached to one another in detachable fashion whereby mechanical response lag owing to movement between said mechanism and holder is substantially eliminated yet they are readily separable.

Another feature of the present invention is the provision of a unique spring loaded pen carriage assembly which is mounted on a recorder carriage bar and is adapted to be rotatable about an axis of the carriage bar whereby a predetermined pressure may be maintained upon at least one recorder pen point as it moves across an irregular surface and recording having a skip-free writing characteristic may be achieved at high writing speeds for various recording modes. One advantage of this unique pen carriage assembly is that it may be adapted to hold two recorder pens for recording in different recording modes in a predetermined sequence or for recording in the same recording modes in identifiable sequence.

Still another feature of the present invention is the provision of a unitary pen reservoir structure containing an ink reservoir and tubular capillary means therein supplying a steady flow of ink to the recording pen for various orientations of the pen reservoir structure.

Figure 5:
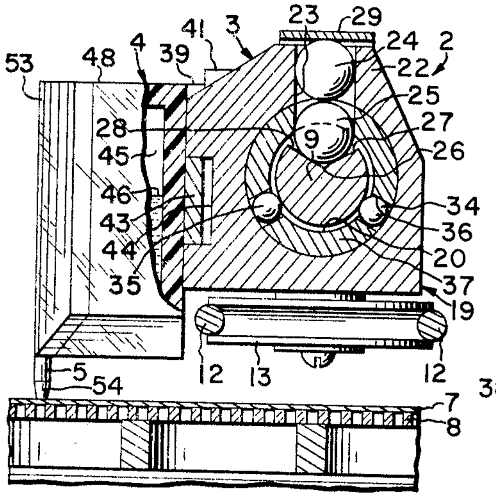
Figure 5A:
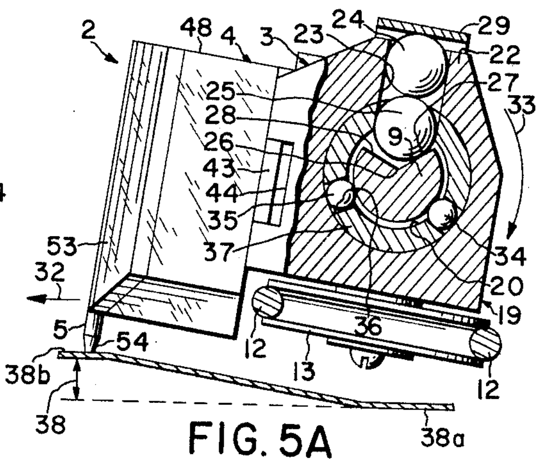
Figures 6, 7:
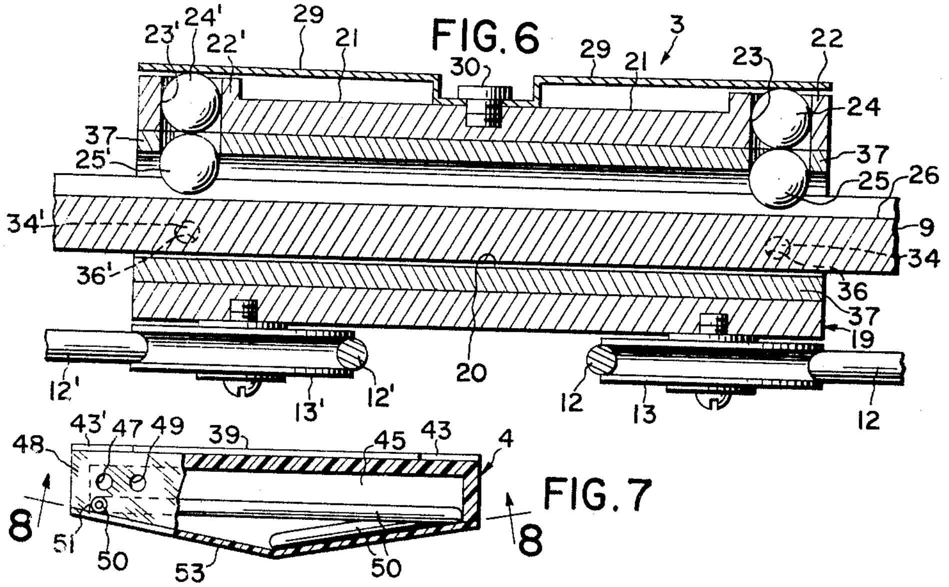
Figure 8:
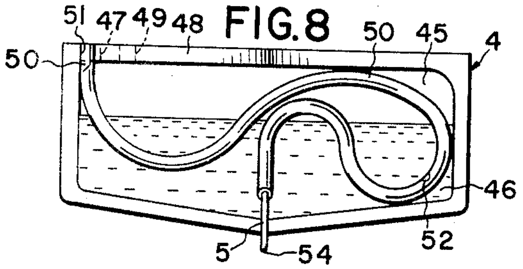
Figure 10:
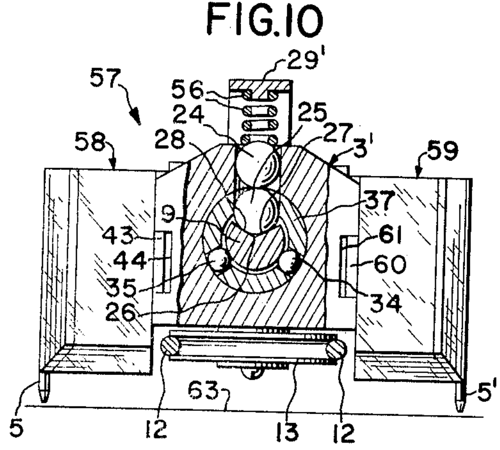
Figure 10A:
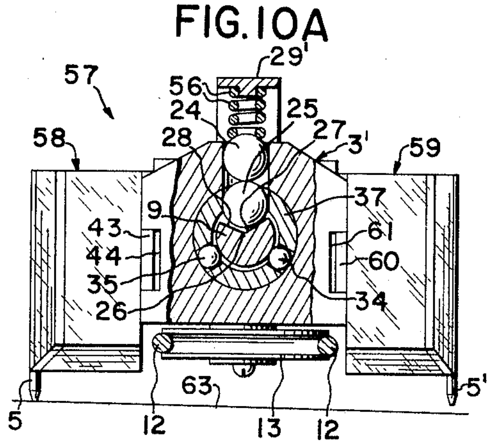
Figure 10B:
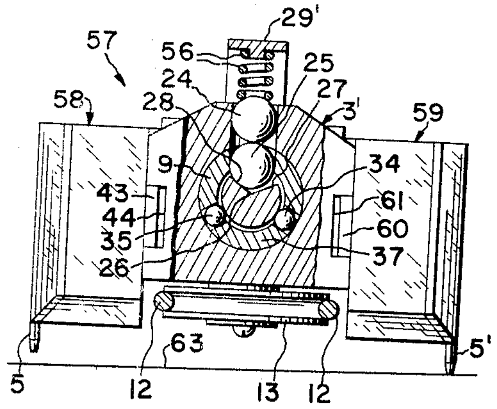
Figure 9:
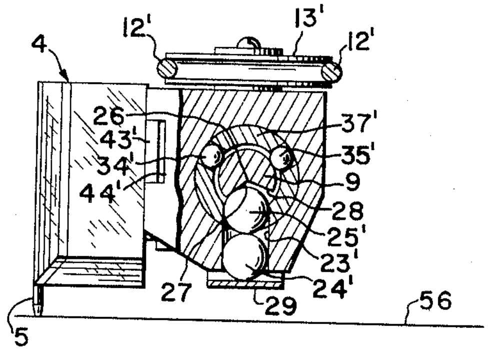
Figure 9:
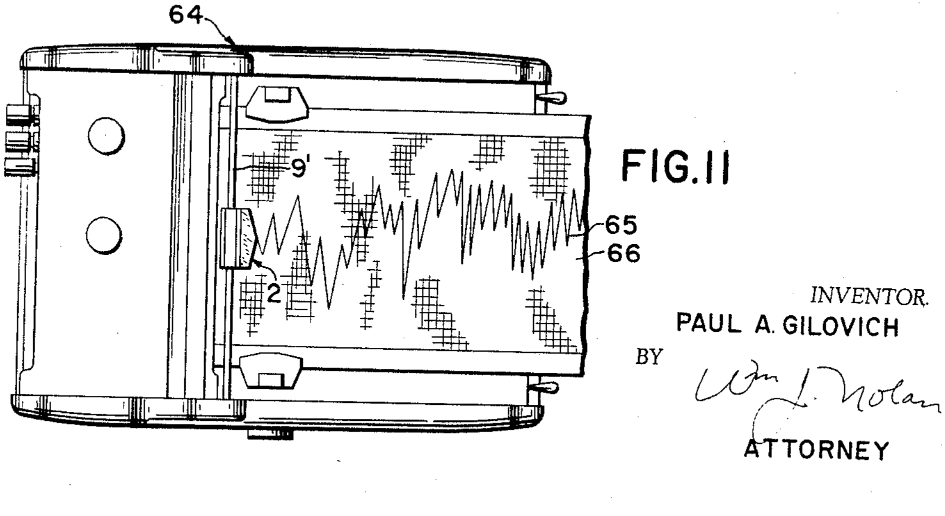

These and other features and advantages of the present invention will be more apparent after a perusal of the following specification taken in connection with the accompanying drawings wherein, the same numeral is used in the various figures for the same or analogous element, and:

FIG. 1 is an isometric view partially broken away, of a recorder of the X–Y type upon which a pen carriage assembly is mounted, in accordance with the present invention, FIG. 2 is an isometric view of the pen carriage assembly of the recorder of FIG. 1 mounted upon a carriage bar in accordance with the present invention, FIG. 3 is an isometric view of the pen holder and carriage bar of FIG. 2, the pen mechanism being detached therefrom, FIG. 4 is an isometric rear view of the pen mechanism shown in FIG. 2, FIG. 5 is an enlarged cross-sectional view taken along section line 5—5 of FIG. 2, showing the pen mechanism in contact with the recorder writing surface, FIG. 5A is an enlarged cross-sectional view taken along section line 5—5 of FIG. 2 showing the pen mechanism in contact with an irregular writing surface, FIG. 6 is an enlarged cross-sectional view taken along section line 6—6 of FIG. 2, FIG. 7 is a plan view, partially broken away, showing the pen mechanism of FIG. 4, FIG. 8 is a cross-sectional view of the pen mechanism taken along the section line 8—8 of FIG. 7, FIG. 9 is another cross-sectional view of the pen carriage structure of FIG. 2 mounted in an inverted V configuration upon a carriage bar in accordance with the present invention, FIG. 10 is a cross-sectional view of a unique recording device comprising the pen holder of FIG. 2 having two recording structures attached thereto, the said recording device being disposed in a non writing position, FIG. 10A is a cross-sectional view of the recording device of FIG. 10 disposed in a first writing position in accordance with the present invention, FIG. 10B is a cross-sectional view of the recording device of FIG. 10 disposed in a second writing position in accordance with the present invention, FIG. 11 is a plan view of a graphic recorder upon which the pen carriage assembly of FIG. 2 is mounted in acordance with the present invention.

Referring now to FIGS. 1 and 2, there is shown a recorder 1 of the X–Y type, for example, upon which a pen carriage assembly 2 is mounted. Pen carriage assembly 2 may comprise a pen holder 3 and a pen 4. Pen 4 includes a pen stylus 5 suitable for scribing a curve 6 upon a recording paper 7 which may be positioned upon writing surface or platen 8. Pen holder 3 is mounted upon and adapted to move coaxially along a "Y" axial carriage bar 9. Carriage bar 9 may be joined to "X" axial side carriages 10 which are movable by means of cords and pulleys (not shown) which produce movement along the "X" axis as is well known in the art. Movement of pen carriage assembly 2 along the "Y" axis likewise may be produced in a known fashion as a result of tension exerted upon cords 12 and 12′ attached to pulleys 13 and 13′ which are mounted upon carriage structure 3.

Pen carriage assembly 2 may be disposed in a raised, non-writing position with respect to platen 8 until an electrical signal initiates movement of carriage bar 9 (shown as broken away) across platen 8. Pen carriage assembly 2 may be lowered into a writing position in which pen stylus 5 contacts the paper 7 on platen 8 in a manner described hereinafter.

In the embodiment shown by way of example, carriage bar 9 extends through an apertured side arm 14 and fits slidably within "X" axial side carriage 10. The side arm 14, which is mounted upon carriage bar 9, includes a cylindrical bearing 15 adapted to roll within a U groove 16 of the recorder 1. Cylindrical bearing 15 may roll in contact with the lower edge 17 of groove 16, in which case pen carriage assembly 2 is disposed in the aforementioned raised position. Side arm 14 may be lowered so that bearing 15 rolls in contact with the upper edge 18 of groove 16 by moving the U groove downwards by means of a multiple position solenoid operated spring mechanism (not shown). Lowering of side arm 14 produces rotation of carriage bar 9, thereby causing pen carriage assembly 2 to rotate from the raised position into the writing position, for example.

Referring now to FIGS. 3 through 6, pen holder 3 includes a metallic carriage housing 19 having a cylindrical aperture 20 extending longitudinally therethrough. Carriage bar 9 is adapted to fit slidably within aperture 20 and to extend therethrough so that carriage housing 19 is supported by carriage bar 9 and may be moved along carriage bar 9 in response to a control signal. Carriage housing 19 comprises a central housing section 21 and identical bearing support structures 22 and 22′ at the apertured ends thereof. Bearing support structures 22 and 22′ are apertured, each identically having a cylindrical opening 23 (23′) which extends through the upper portion thereof. A metallic pressure ball bearing 24 (24′) is slidably fitted within each opening 23 (23′) and rests on top of a metallic groove contacting ball bearing 25 (25′) disposed within the bottom portion of each opening 23 (23′). Each bearing 25 (25′) is positioned so as to rest in contact with two points of a longitudinally extending V-shaped groove 26 in carriage bar 9. V-shaped groove 26 may be formed by taking a 120 degree cut-out of cylindrical bar 9, for example. Two identical groove contacting bearings 25 and 25′ are thus provided which are adapted to roll along the V-shaped groove 26 of carriage bar 9 in a substantially frictionless manner. Bearings 25 and 25′ may roll in substantially frictionless manner in contact with both wall surfaces 27 and 28 of V-shaped groove 26 or in contact with only one of the walls 27, depending on the orientation of pen carriage assembly 2 with respect to the writing surface 8 as described hereinafter.

Pen carriage bar 9 in practice may be fixed in spaced apart relation to writing surface 8. Although groove contacting bearings 25 and 25′ are adapted to roll freely within groove 26 each bearing 25 (25′) may be constrained to slide within an opening 23 (23′) under a tension exerted upon bearing 24 (24′) by means of metallic spring member 29. Spring member 29 may be made of a thin metallic strip which has been bent so as to press upon pressure bearings 24 and 24′, for example. Spring member 29 may be secured to the central housing section 21 by screw means 30 as shown in FIG. 6. The tension exerted upon pressure bearings 24 and 24′ may be varied by using metallic strips of varying thickness so that different tracking forces may be applied to pen stylus 5 in a manner to be described for recording in various writing modes including inkless writing, for example. The spring tension alternatively may be substantially increased by provision of coil spring means (not shown) adapted to fit within openings 23 and 23′ about bearings 24 and 24′ respectively, as may be advantageous for recording in certain writing modes including magnetic recording modes, for example.

Referring now more particularly to FIG. 5A, pen holder 3 is shown in pen 4 including pen stylus 5 attached to pen holder 3. Pen stylus 5 may be in contact with an irregular writing surface 31 which might consist of a wrinkled recording paper or a disc of uneven thickness, for example. Pen 4 may be replaced by a structure (not shown) having a stylus adapted to be heated or adapted to plot point in which case writing surface 31 might consist of a recording paper having a waxy surface, for example. Pen might alternatively be replaced by another structure (not shown) having a stylus adapted to be rapidly moved across an uneven magnetic recording surface in spaced apart relation thereto for use in connection with magnetic recording devices, for example. The operation of pen holder 3 together with a pen 4 may be understood as follows, wherein pen stylus 5 is assumed to move across surface 31 in contact therewith in a direction 32 opposite to the positive "X" direction in which pen carriage assembly 2 is caused to move while in a writing position in recorder 1 of FIG. 1, for example. As pen stylus 5 moves across surface 31 in a direction 32, the surface 31 exerts increased reactive force upon stylus 5 producing a resultant torque about the axis of carriage bar 9. As a result of this unbalanced torque, pen carriage assembly 2 may be caused to be rotated about carriage bar 9 in a clockwise direction 33. Two metallic rotational ball bearings 34 and 35 (or 34′ and 35′) may be provided within each bearing support structure 22 (or 22′) so that carriage bar 9 is free to rotate in a substantially frictionless manner in the clockwise direction 33. Bearings 34 and 35 (34′ and 35′) are disposed in contact with carriage bar 9 within a slotted section 36 (36′) of an annular member 37 (37′) of bearing support structure 22 (22′). The use of bearings 25, 34 and 35 (25′ 34′ and 35′) permits the carriage assembly 2 to be moved in a "Y" axial direction in a substantially frictionless manner as is required in order to ensure rapid mechanical response in accordance with a control signal. As pen stylus 5 moves upwards a distance 38 as shown in FIG. 5A, groove contacting bearing 25 may roll outwards from the center of V-shaped groove 26 in contact with wall 27 (and no longer in contact with wall 28) and move upwards a short distance within opening 23 pushing against pressure bearing 24. As pressure bearing 24 (24′) moves upwards within aperture 23 (23′) it tends to push spring member 29 outwards a short distance which may be approximately one quarter of the vertical distance 38 through which pen stylus 5 may move, for example.

If the direction of movement of carriage bar 9 is now reversed so that pen carriage assembly 2 moves along the positive "X" direction of recorder 1, for example, spring member 29, having been stretched by the upward directed movement of bearing 24 (24′) and 25 (25′) within opening 23 (23′) may now exert a restoring force upon bearings 24 (24′) and 25 (25′). Spring member 29 tends to press bearing 24 (24′) downwards towards an "equilibrium" position in which bearings 25 and 25′ contact wall surfaces 27 and 28 of V-groove 26 as shown in FIG. 5, for example. Carriage bar 9 might be oriented in a normal writing position such as that shown in FIG. 5A, for example, by rotating carriage bar 9 in FIG. 5 through a predetermined angle whereby a predetermined pressure may be exerted upon pen stylus 5 when it contacts surface 8. In such a case, if pen holding carriage structure 3 were now moved in FIG. 5A in a direction opposite to arrow 32 (corresponding to the positive "X" direction in FIG. 1) from a surface level 38*b* (taken as the usual surface level) downwards towards a depressed level 38*a*, pen stylus 5 would remain in contact with the surface 31, bearings 25 and 25' finally resting in the aforementioned equilibrium position in contact with walls 27 and 28 of groove 26. This equilibrium position would define the lowest point on the writing surface 8 which the pen stylus would contact while writing. Thus it is seen that a predetermined pressure may be exerted upon pen stylus 5 as it contacts a writing surface and that pen carriage assembly 2 may be adapted to move across an uneven surface having elevational and depressional irregularities while maintaining constant contact therewith.

Referring now to FIG. 9, there is shown one alternative embodiment of the present invention in which the V-shaped groove 26 is downwardly directed in an inverted V configuration and is disposed so that a predetermined pressure may be exerted upon pen stylus 5 in the writing position. In this embodiment, carriage bar 9 is brought nearer the recording surface 56 by lowering of side carriages 10 of recorder 1 (FIG. 1), for example, so that pen stylus 5 may contact recording surface 56 in a substantially perpendicular fashion. The position of side carriages 10 may also be changed or may be otherwise adapted to support cords 12 and 12' in proper alignment therewith. Whenever the V-shaped groove in carriage bar 9 is upwardly directed as in FIG. 5, dust may collect within the groove 26 impeding movement of ball bearings 25 and 25' within the groove and thereby impairing the mechanical response of the pen carriage assembly 2. An inverted V configuration, therefore, may advantageously be utilized to minimize the amount of dust collected within groove 16.

The use of groove contacting bearings 25 and 25' adapted to roll upon wall surface 27 and/or wall surface 28 in a direction transverse to the axis of carriage bar 9 together with rotational bearings 34 and 35 (34' and 35') permits pen stylus 5 to be quickly raised while maintaining steady contact with the writing surface whenever pen carriage assembly 2 moves slowly or rapidly up to the crest of a surface irregularity. The use of spring member 29, moreover, together with the aforementioned bearings permits pen stylus 5 to be quickly lowered while maintaining steady contact with the writing surface whenever pen carriage assembly 2 moves slowly or rapidly downwards from the crest of a surface irregularity. The rapidity of downwardly-directed movement may in some embodiments be increased by provision of additional coiled spring means 56 such as those shown in FIG. 10, for example. Thus a unique pen carriage structure is provided which is adapted to hold various recording structures containing styli suitable for recording in different modes and which is adapted to move at rapid speeds across uneven recording surfaces without bouncing or skipping owing to the uneveness of the writing surface.

Referring now to FIGS. 10, 10A and 10B, cross-sectional views are shown of a unique recording device 57 comprising a modified pen holder 3' having attached thereto recording structures 58 and 59 adapted for recording in various recording modes. Recording structure 58 may be attached to pen holder 3' in the aforementioned manner, having lip 43 slidably fitting within groove 44. Recording structure 59 likewise may be attached to pen holder 3' in the aforementioned manner, having a lip 60 identical to lip 43 (and a lip 60' identical to lip 44 but now shown) slidably fitting within groove 61 (or a groove 61' not shown). Recording structure 58 might be adapted for scribing a continuous curve upon recording surface 63 and might comprise pen 4 of FIG. 4, for example, while recording structure 59 might be adapted for point-plotting a curve by rotating stylus 5' into contact with recording surface 63 in a predetermined sequence, for example. Recording structure 59 alternatively might comprise a pen 4' containing an ink of a first distinctive color while recording structure 58 might contain an ink of another color readily distinguishable from said first distinctive color.

Pen holder 3' may also contain additional coil springs 56 (56') which fit within opening 23 (23') and may be compressed by means of spring member 29' for increasing the tension exerted upon pen stylus 5, for example.

Referring now more particularly to FIG. 10, recording structure 57 is shown in a non-writing position in which neither stylus 5 nor stylus 5' contacts the writing medium 63. Carriage bar 9 may be adapted to be rotatable in either a clockwise or counterclockwise direction. Side arm 14 of recorder 1 (FIG. 1) may be caused to move to an uppermost position corresponding to counterclockwise rotation of carriage bar 9 into a first recording position (FIG. 10A) or to a lowermost position corresponding to clockwise rotation of carriage bar 9 into a second recording position (FIG. 10B) by means of recorder control means (not shown), for example.

Referring now to FIGS. 10A and 10B, recording structure 57 may be caused to move across writing surface 8 of recorder 1 (FIG. 1) contacting writing medium 63 along the positive "X" direction in a first recording position shown in FIG. 10A and to return across writing surface 8 along the negative "X" direction in a second recording position shown in FIG. 10B, for example. Recording device 57 thus may be caused to move in a forward direction tracing a continuous curve corresponding to a sweep input signal in a first color of ink and then to reverse direction tracing a continuous or point-plotted curve corresponding to this sweep input signal in a second different color of ink whereby each curve conveniently may be identified, for example.

Thus a first curve may be traced in response to an input signal and then a second curve representing the value of this input signal at a later period of time may be superposed on the first curve. Two families of curves may thus be plotted, one set of curves representing odd successive time intervals and the other set of curves representing even successive time intervals.

The length of the time intervals may be adjusted by providing means for generating an internal sweep signal within recorder 1 (FIG. 1) utilizing this signal to produce a given rate of movement of carriage bar 9 along the "X" axial direction, for example. Since switching between the first recording position (FIG. 10A) and the second recording position (FIG. 10B) at the end margins of the recorder may be accomplished in relatively short periods of time of the order of milliseconds for solenoid operated switching, for example, substantially continuous recording thereby may be achieved in a recorder of the X–Y type.

Referring now to FIG. 11, pen carriage assembly 2 of FIG. 2 alternatively may be monuted upon a graphic recorder 64 of the strip chart type. Stylus 5 may scribe a curve 65 upon strip chart recording paper 66 which is adapted to be moved by rollers (not shown). Pen carriage assembly 2 slides upon carriage bar 9' as described above. Carriage bar 9' is substantially identical to carriage bar 9 of FIG. 2 except that it may be shorter or longer than carriage bar 9, since graphic recorders of various sizes adapted to accommodate strip chart recording papers of various widths are envisioned.

Referring now to FIGS. 3 and 4, pen holder 3 may be attached to pen 4 in a novel manner whereby mechanical response lag of pen carriage assembly 2 in substantially eliminated and pen 4 may be quickly detached from pen holder 3. Pen 4 may include a connective member 39 which may be a steel plate, for example. Pen holder 3 may include a pen holding member 40, consisting of a permanent magnet strip 41 and supporting strip 42 which are cemented to central housing section 21 of carriage housing 19, for example. Connective member 39 alternatively may be made of a permanently magentized material while pen holding member 40 may be a steel plate, for example. Connective member 39 may include lips 43 and 43' which are adapted to fit in interlocking fashion within grooves 44 and 44' of bearing support structures 22 and 22' respectively. Pen 4, therefore, may be attached in interlocking fashion to pen holder 3 without the use of set screws or the like by the provision of a connective member 39 and a pen holding member 40 having an attractive magnet affinity for connective member 39. Pen 4 may quickly be detached for carriage structure 3, moverover, simply by breaking the magnetic bond existing between connective member 39 and pen holding member 40 when attached thereto. This uique combination of two members adapted to be connected in quickly detachable interlocking fashion advantageously permits unitary movement of pen carriage assembly 2 in response to a control signal by preventing movement between pen holder 2 and pen 4. Pen 4 and pen 3 are thereby constrained to move together initially in accordance with a control signal, whereby mechanical response lag within pen carriage assembly 2 is substantially eliminated. The use of this unique magnetic interlocking connection also obviates the need for using means such as set screws, for example, which may prevent motion of the writing structure with relation to the carriage structure but which disadvantageously delays removal of the pen whenever adjustment is required.

Referring now to FIGS. 7 and 8, pen 4 may include a hollow structure made of a translucent supporting material such as acrylic (methyl methacrylate) resin ("Lucite"), for example, forming a reservoir structure 45 suitable for containing a writing fluid 46 therewithin. In the present embodiment, writing fluid 46, which may be ink, for example, may be introduced into reservoir 45 through filling inlet 47 in wall 48. During filling air may pass from reservoir 42 through port 49 in wall 48. Pen reservoir structure 45 may be sealed when it is utilized in conjunction with recorder 1 (FIG. 1). Filling inlet 47 and port 49 may be covered with masking material (not shown) or may be filled with plugs (not shown), for example.

Pen reservoir structure 45 may contain a capillary tube 50 having an inner diameter of 0.030 inch, for example, and an outer diameter of 0.060 inch, for example, and consisting of a flexible plastic material such as tetrafluoroethylene ("Teflon"), for example. Capillary tube 50 may be substantially enclosed within reservoir structure 45 thereby advantageously eliminating difficulties with prior art capillary tubes due to interference of the capillary tubes with movement of the pen carriage mechanisms.

Capillary tube 50 may however, extend through an outlet 51 in wall 48 whereby tube 50 may be removed, in the event that it is necessary to repair or replace it, for example. In some embodiments, outlet 51 may be plugged or covered with masking material (not shown), for example. Alternatively, capillary tube 50 may be disposed entirely within reservoir 45. A small opening 52 in capillary tube 50 is provided so that writing fluid 46 may enter the tube and flow to pen stylus 5 in order that a curve 6 may be scribed upon a recording paper 7 (FIG. 1). Pen stylus 5 may extend through wall 53 of pen reservoir structure 45 and may slidably fit within one end of a capillary tube 50. Pen stylus 5 may comprise a small thick walled metallic clyinder rounded about the writing tip 54 and having an outer diameter of 0.025 inch, for example, and a sufficiently small inner diameter 0.008 inch, for example, so that writing fluid 44 will not flow freely through tip 54 except when tip 54 is in contact with a recording paper.

Pen stylus 5 is adapted to write upon a recording paper 7 positioned in a horizontal plane as is the case whenever recorder 1 (FIG. 1) is placed in a horizontal position, for example. Whenever pen stylus 5 contacts a horizontal writing surface 8 with its writing tip 54 pointing in a substantially downwardly directed manner, writing fluid 46 may flow through stylus 5 onto the surface 8 owing primarily to gravitational force acting upon fluid disposed within capillary tube 50. In some applications, it is desirable to place a recorder in certain vertical positions such as might be formed by mounting recorder 1 (FIG. 1) in a vertical rack mount (not shown) with the electronic control console 55 pointing in a downwardly directed manner, for example. As long as the level of writing fluid 46 in reservoir 45 remains above opening 52 in capillary tube 50, writing fluid 46 will flow through pen stylus 5 owing to capillary and/or gravitational forces acting upon fluid disposed within capillary tube 50. Pen 4, therefore, is advantageously adapted for writing upon recorder writing sufaces which may be oriented in a horizontal position or in one or more vertical positions as may be required in various applications.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a recorder having a writing surface, a carriage means having a passageway, the longitudinal axis of said passageway being disposed substantially parallel to said writing surface, and a carriage bar spaced from said writing surface and disposed within said passageway, said carriage means adapted to slide upon and rotate about said bar, improved writing means comprising: a pen holder connected to said carriage means; a pen including a stylus for scribing a curve upon said writing surface; and, connective means for magnetically attaching said pen to said pen holder.

2. The means according to claim 1 wherein, said pen includes a connective plate having at least one lip-like extension whose longitudinal axis is disposed substantially parallel to said writing surface, and said pen holder includes a holding plate and at least one groove adapted to receive said connective plate lip-like extension in slidable fashion, said connective plate and said holding plate having a magnetic affinity for each other to form said magnetic connective means.

3. A recorder pen comprising: a reservoir structure adapted to contain writing fluid, said structure containing a first aperture for admitting writing fluid to said reservoir structure and adapted to be closed when not in use, and a second aperture for providing egress of air from said reservoir during filling and adapted to be closed when not in use; a stylus having one end adapted to scribe a curve upon said writing surface and an opposite end extending into said reservoir structure; tubular capillary means disposed within said reservoir structure for conducting writing fluid within said reservoir to said stylus, said capillary means having a first end connected to said stylus and a small filling aperture adjacent said first end which is immersed in said writing fluid when said reservoir structure contains writing fluid.

4. The pen according to claim 3 wherein said reservoir structure has a third aperture and said tubular capillary means has a second end extending through said third aperture.

5. The means according to claim 1, wherein said carriage means has a V-shaped groove extending lengthwise through said bar and includes at least one cylindrical walled passageway extending from a single external opening into said longitudinal passageway and forming a T-shaped connection therewith, bearing means disposed within said at least one cylindrical walled passageway, and spring means adapted to press upon said bearing means so that at least one part of said bearing means remains in contact with at least one point of said V-shaped groove as said carriage means moves longitudinally along said carriage bar or rotates thereabout.

6. The means according to claim 5, wherein said carriage means includes an annular member extending longitudinally therethrough and adapted to fit slidably about said carriage bar, said annular member having at least one annular slotted section containing at least two ball bearings adapted to roll in contact with said carriage bar for producing substantially frictionless rotational movement of said carriage means about said longitudinal axis of said bar.

7. The means according to claim 6, wherein said spring means includes at least one coiled member adapted to slidably fit within said at least one cylindrical walled passageway; and an enclosing metallic member covering said at least one walled passageway and compressing said coiled member therein.

8. The means according to claim 7, wherein said enclosing metallic member is a thin metallic strip having at least one lip-like member extending perpendicularly therefrom and being adapted to fit within said at least one coiled member.

9. The means according to claim 6, wherein said bearing means comprises a first metallic ball bearing adapted to move in contact with said V-shaped groove and with the wall of said at least one cylindrical walled passageway; and a second metallic ball bearing adapted to move in contact with said first ball bearing, said wall, and said spring means, said second ball bearing extending partly external to said aperture and outwardly therefrom, and said spring means comprises a thin metallic strip adapted to be mounted external to said at least one walled passageway and adapted to press in contact with said second ball bearing extending outwardly therefrom.

10. In a recorder of the X–Y type including; first control means for providing movement of a recording element across a recording surface of said recorder in variable accordance with a first signal; second control means for providing movement of said recording element across said recording surface independently of the movement provided by said first control means in variable accordance with a second signal; and a third control means operable with said first and second control means for disposing said recording element in at least one recording position in contact with a recording medium disposed on said recording surface, improved recording means comprising in combination:

(1) cylindrical supporting shaft means having a groove with the shape of a V extending therethrough, said shaft means having a longitudinal shaft axis parallel to the line formed by the bottom point of said V extending longitudinally through said shaft means, said shaft means being disposed with said shaft axis parallel said recording surface and spaced apart a fixed distance therefrom and said shaft means being rotatable by said third control means about said shaft axis, and movable by said second control means across said recording surface with said shaft axis remaining said fixed spaced apart distance therefrom, (2) arm means associated with said third control means mechanically connected thereto adapted to slidably fit about said shaft means, whereby said shaft means is rotatable, (3) pen holding carriage means mounted upon said supporting shaft means and adapted to be moved by said first control means along a direction parallel said shaft axis while being rotatable about said shaft axis comprising:

(a) a housing structure having a longitudinal shaft aperture extending between the opposite ends thereof and having an annular member adapted to fit slidably within said aperture, said annular member having two annular slotted sections therein each containing two identical ball bearings for producing substantially frictionless rotational movement of said carriage means about said shaft axis, said housing structure having at least one slotted housing side wall and a second housing side wall having two cylindrical side apertures therein adjacent said opposite ends thereof and each said aperture extending inwardly from a single external opening into said shaft aperture, intersecting said shaft aperture in a substantially perpendicular direction, and forming a T-shaped connection therewith, (b) two identical groove contacting ball bearings, one being disposed in each of said side apertures in contact with at least one point of said V groove, (c) two identical spring contacting ball bearings, one being disposed in each said cylindrical side wall aperture in contact with each said groove contacting bearing, said spring contacting bearing having a part thereof projecting outwardly from each said side aperture, (d) a spring member comprising a thin metallic strip adapted to be mounted upon said housing structure and pressing in contact with said spring contacting bearings, (e) a carriage connective structure comprising a first thin metallic connective member joined centrally to said first housing side wall and a second thin connective member joined to said first connective member, said second connective member being a permanently magnetized material having a magnetic attraction for said first connective member, (4) a first pen reservoir structure adapted to be connected to said at least one slotted housing side wall comprising:

(a) wall structure enclosing a reservoir containing writing fluid therein, said wall structure comprising first and second end members, a front member containing said recording element extending therethrough into said reservoir, a lower member, an upper member containing a filling opening for introducing writing fluid into said reservoir, an air opening for permitting egress of air from said reservoir during filling, and a cylindrical capillary opening, each of said openings being disposed adjacent said first end member of said wall structure, and a rear member having a connective mounting structure centrally joined thereto, (b) capillary means having a tubular central portion disposed within said reservoir, said central portion having a small opening therein adjacent said second end member of said wall structure and said capillary means extending at one end thereof through said small cylindrical opening and being connected at the other end thereof to said recording element, whereby writing fluid may be introduced into said recording element whenever said first pen reservoir structure is disposed in a horizontal position or in one or more vertical positions, (c) a connective mounting structure comprising a thin metallic sheet having one side thereof centrally joined to said rear member of said first pen reservoir structure and having two lip-like members adapted to fit within slotted portions of said at least one slotted housing side wall, said metallic connective structure having a magnetic affinity for said carriage connective structure and being rigidly attachable to said second connective member, whereby said first pen reservoir structure may be quickly separated from said pen holding carriage means and uniform recording may be achieved at high recording speeds without mechanical response lag of said recording means and without skipping of said recording element owing to unevenness of said recording surface.

11. A recorder according to claim 10, wherein said shaft means is mounted upon said recorder having the V of the V-shaped groove opening towards the recording surface and the tip of the V pointing away from said recording surface, whereby sustantially less dust may accumulate in the said V-shaped groove and mechanical response lag of said recording means thereby may be improved.

12. A recorder according to claim 10, wherein said third control means is adapted to provide automatic switching between a first recording position and a second recording position and said at least one slotted housing side wall comprises a first slotted side wall, said first pen reservoir structure being attached thereto, and a second slotted side wall disposed in said housing structure opposite said first slotted side wall; and further including a second recording structure attached to said second slotted side wall, and said first pen reservoir structure is adapted to be disposed in contact with said recording medium in said first recording position while being moved along a first X axial direction of said recorder for scribing a first curve or first family of curves, and said second recording structure is adapted to be disposed in contact with said recording medium in said second recording position while being moved along a direction opposite said first X axial direction for scribing a second curve or second family of curves, whereby said second curve or family of curves may be superposed on said first curve or family of curves and substantially continuous recording may be achieved in a recorder of the X–Y type.

13. A recorder according to claim 12 wherein, said second recording structure comprises a second pen reservoir structure substantially identical to said first pen reservoir structure, said first pen reservoir structure containing a first colored ink therein and said second pen reservoir structure containing therein a second ink, having a second color readily distinguishable from said first color, whereby said first curve may be scribed identifiably in said first color and said second curve may be identifiably scribed in said second color and said first curve may be readily distinguished from said second curve.

14. In a graphic recorder including first control means for providing movement of a recording element across a recording surface of said recorder in variable accordance with a first signal; second control means for providing movement of a recording paper across said recording surface independently of the movement provided by said first control means in variable accordance with a second signal; and third control means operable with said first and second control means for disposing said recording element in a recording position in contact with said recording paper, improved recording means comprising in combination:

(1) cylindrical supporting shaft means having a groove with the shape of a V extending therethrough, said shaft means having a longitudinal shaft axis parallel to the line formed by the bottom point of said V extending longitudinally through said shaft means, said shaft means being disposed with said shaft axis parallel said recording surface and spaced apart a fixed distance therefrom and said shaft means being rotatable by said third control means about said shaft axis, (2) arm means associated with said third control means and mechanically connected thereto adapted to slidably fit about said shaft means, whereby said shaft means is rotatable, (3) pen holding carriage means mounted upon said supporting shaft means and adapted to be moved by said first control means along a direction parallel said shaft axis while being rotatable about said shaft axis comprising:

(a) a housing structure having a longitudinal shaft aperture extending between the opposite ends thereof and having an annular member adapted to fit slidably within said aperture, said annular member having two annular slotted sections therein each containing two identical ball bearings for producing substantially frictionless rotational movement of said carriage means about said shaft axis, said housing structure having at least one slotted housing side wall, a second housing side wall having two cylindrical side apertures therein adjacent said opposite ends thereof and each said aperture extending inwardly from a single external opening into said shaft aperture, intersecting said shaft aperture in a substantially perpendicular direction, and forming a T-shaped connection therewith, (b) two identical groove contacting ball bearings, one being disposed in each of said side apertures in contact with at least one point of said V groove, (c) two identical spring contacting bearings, one being disposed in each said cylindrical side wall aperture in contact with each said groove contacting bearing, said spring contacting bearing having a part thereof projecting outwardly from each said side aperture, (d) a spring member comprising a thin metallic strip adapted to be mounted upon said housing structures and pressing in contact with said spring contacting bearings, (e) a carriage connective structure comprising a first thin metallic connective member joined centrally to said first housing side wall and a second thin connective member joined to said first connective member, said second connective member being a permanently magnetized material having a magnetic attraction for said first connective member, (4) a first pen reservoir structure adapted to be connected to said at least one slotted housing side wall comprising:

(a) wall structure enclosing a reservoir containing writing fluid therein, said wall structure comprising first and second end members, a front member containing said recording element extending therethrough into said reservoir, a lower member, an upper member containing a filling opening for introducing writing fluid into said reservoir, an air opening for permitting egress of air from said reservoir during filling, and a cylindrical capillary opening, each of said openings being disposed adjacent said first end member of said wall structure, and a rear member having a connective mounting structure centrally joined thereto, (b) capillary means having a tubular central portion disposed within said reservoir, said central portion having a small opening therein adjacent said second end member of said wall structure and said capillary means extending at one end thereof through a said small cylindrical opening and being connected at the other end thereof to said recording element, whereby writing fluid may be introduced into said recording element whenever said pen reservoir structure is disposed in a horizontal position or in one or more vertical positions, (c) a connective mounting structure comprising a thin metallic sheet having one side thereof centrally joined to said rear member of said pen reservoir structure and having two lip-like members adapted to fit within slotted portions of said at least one slotted housing side wall, said metallic connective structure having a magnetic affinity for said carriage connective structure and being rigidly attachable to said second connective member whereby said pen reservoir structure may be quickly separated from said pen holding carriage means and uniform recording may be achieved at high recording speeds without mechanical response lag of said recording means and without skipping of said recording element owing to unevenness of said recording surface.

15. A recorder according to claim 14, wherein said at least one slotted housing side wall comprises first and second slotted housing side walls disposed on opposite sides of said housing structure, said first pen reservoir structure being attached to said first slotted housing side wall and further including a digital recording structure for producing a point plotted curve, said recording structure being attached to said second slotted housing side wall, and switching is provided automatically by said third control means between a first recording mode wherein said pen reservoir structure is disposed in a first recording position in contact with said recording paper and said digital recording structure is disposed in a nonrecording position, and a second recording mode wherein the digital recording structure is disposed in a second recording position in contact with said recording paper and said pen reservoir structure is disposed in a nonrecording position, whereby substantially continuous recording in either a first analog recording mode or in a second digital recording mode may be achieved.

16. A recorder according to claim 14, wherein said third control means is adapted to provide automatic switching between a first recording position and a second recording position, and said at least one slotted housing side wall comprises a first slotted side wall, said first pen reservoir structure being attached thereto, and a second slotted side wall disposed in said housing structure opposite said first slotted side wall, and further including a second recording structure attached to said second slotted side wall, and said first pen reservoir structure is adapted to be disposed in contact with said recording paper in said first recording position for scribing a first curve or first family of curves, and said second recording structure is adapted to be disposed in contact with said recording paper in said second recording position for scribing a second curve or second family of curves, whereby substantially continuous recording in two different recording modes may be achieved in a graphic recorder.

17. A recorder according to claim 16, wherein said second recording structure comprises a second pen reservoir structure identical to said first pen reservoir structure, said first pen reservoir structure containing a first colored ink therein and said second pen reservoir structure containing therein a second ink having a second color readily distinguishable from said first color, whereby said first curve or family of curves may be scribed identifiably in said first color and said second curve or family of curves may be identifiably scribed in said second color and said first curve or family of curves may be readily distinguished from said second curve or family of curves.

References Cited by the Examiner

UNITED STATES PATENTS

| | | | |
|---|---|---|---|
| 2,398,666 | 4/46 | Reason | 73—105 |
| 2,692,301 | 10/54 | Ress | 178—18 |
| 2,761,753 | 9/56 | Iatesta | 346—62 |
| 2,766,097 | 10/56 | Zabriskie | 346—139 |
| 2,775,502 | 12/56 | Sykora | 346—49 |
| 2,891,107 | 6/59 | Weingart et al. | 178—18 |
| 2,963,337 | 12/60 | Spalek | 346—140 |
| 3,125,401 | 3/64 | Boone | 346—140 |

LEYLAND M. MARTIN, *Primary Examiner.*